(12) United States Patent
Kwon et al.

(10) Patent No.: US 7,184,630 B2
(45) Date of Patent: Feb. 27, 2007

(54) OPTICAL COUPLING MODULE WITH SELF-ALIGNED ETCHED GROOVES AND METHOD FOR FABRICATING THE SAME

(75) Inventors: Young Se Kwon, Daejeon (KR); Bun-Joong Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 11/110,100

(22) Filed: Apr. 19, 2005

(65) Prior Publication Data

US 2005/0185892 A1    Aug. 25, 2005

Related U.S. Application Data

(62) Division of application No. 10/243,027, filed on Sep. 11, 2002.

(30) Foreign Application Priority Data

Sep. 14, 2001    (KR) ............................... 2001-56683

(51) Int. Cl.
*G02B 6/30*       (2006.01)
*G02B 6/00*       (2006.01)
(52) U.S. Cl. ............................. 385/49; 385/50; 385/52
(58) Field of Classification Search .................. 385/49, 385/50, 52, 39, 31, 88, 130
See application file for complete search history.

(56) References Cited

U.S. PATENT DOCUMENTS

| | | | | |
|---|---|---|---|---|
| 3,994,559 A | * | 11/1976 | Crow et al. .................... | 385/49 |
| 4,810,557 A | * | 3/1989 | Blonder ....................... | 428/156 |
| 4,904,036 A | * | 2/1990 | Blonder ....................... | 385/14 |
| 5,444,805 A | * | 8/1995 | Mayer .......................... | 385/49 |
| 5,526,454 A | * | 6/1996 | Mayer .......................... | 385/49 |
| 5,999,670 A | * | 12/1999 | Yoshimura et al. ........... | 385/31 |
| 6,090,635 A | * | 7/2000 | Rothman et al. ............. | 438/24 |
| 6,986,609 B2 | * | 1/2006 | Kim et al. ..................... | 385/88 |

FOREIGN PATENT DOCUMENTS

JP            359159105 A       9/1984

* cited by examiner

*Primary Examiner*—Sung Pak
(74) *Attorney, Agent, or Firm*—Graybeal Jackson Haley LLP

(57) ABSTRACT

The present invention relates to an optical coupling module for optically coupling an optical fiber with an optical waveguide, and a method of fabricating the optical coupling module. In an optical coupling module for optically coupling an optical network with a planar lightwave circuit (PLC), an etched groove for disposition of the optical fiber and an etched groove for mounting of the optical waveguide are exposed using a mask having mask patterns that are aligned with each other, and then anisotropically etched. By doing so, the two grooves can be precisely aligned with each other at one time, compared with a conventional method in which an exposure process is carried out two or more times. Accordingly, an inexpensive structure having high optical coupling efficiency upon manual alignment can be obtained. In addition, since a tapered structure in which an inlet is larger than a body is employed in the optical waveguide, tolerance in vertical and horizontal alignment upon manual alignment can be broaden, resulting in improvement of optical coupling efficiency and facilitation of manual alignment. Furthermore, by utilizing a thick insulation film on the substrate or a thick insulation film of the optical waveguide itself as a board, a structure for allowing assembly into and application to a high-frequency electric-optical circuit can be obtained.

36 Claims, 18 Drawing Sheets

OPTICAL COUPLING MODULE WITH SELF-ALIGNED ETCHED GROOVES AND METHOD FOR FABRICATING THE SAME

CROSS-REFERENCE TO RELATED APPLICATION

This is a divisional application that claims benefit, under 35 USC §120, of co-pending U.S. Utility patent application Ser. No. 10/243,027, filed 11 Sep. 2002, which claims foreign priority benefits under 35 USC §119 (a) to Korean Patent Application 2001-0056683 filed 14 Sep. 2001, which applications are incorporated herein by reference.

BACKGROUND OF THE INVENTION

1. Field of the Invention

The present invention relates to an optical coupling module for optically coupling an optical fiber with an optical waveguide, and a method for fabricating the optical coupling module. More particularly, the present invention relates to an optical coupling module, in which a substrate is anisotropically etched to form thereon two self-aligned grooves having different widths, and an optical fiber is then disposed in one of the grooves while an optical waveguide is disposed in the other of the grooves, so that the optical fiber and optical waveguide can be self-aligned with each other, and a method for fabricating the optical coupling module.

2. Description of the Prior Art

Recently, the amount of information transmission through the internet and data transmission between respective boards of PCs have been rapidly increased. In order to cope with this tendency, there is a increasing demand on optical communication for allowing broadband communication in place of conventional copper wire communication. In such an optical communication system, the optical coupling efficiency at optical coupling portions, such as between optical fiber and optical fiber, between light emitting element and optical fiber, between optical fiber and light receiving circuit, or between light emitting element to light receiving circuit, becomes a significant factor for communication quality in view of efficient transmission of signals. Especially, since an optical coupling circuit with a single-mode optical fiber as media or a conventional optical circuit should have a permissible alignment error of 1 to 2 μm, a simple and precise assembly technique is required.

Among conventional optical coupling methods, an active alignment method and a passive alignment method have been generally used. According to the active alignment method, in a state where a light emitting element is driven or an optical signal is applied to an optical fiber, the light emitting element or other optical circuit elements (for example, optical fiber, optical waveguide and light receiving circuit) should be moved in a vertical or horizontal direction until a position where the optical coupling efficiency reaches the maximum value is determined. A relative position corresponding to the determined position is then fixed with an adhesive or the like. However, although a constant coupling efficiency can be obtained by the active alignment method, the light emitting element should be driven throughout the assembly process. In addition, it takes much time to align the light emitting element to achieve the optimal optical coupling efficiency. Thus, there is a disadvantage in reducing the manufacturing costs.

According to the passive alignment method, desired assembly precision can be obtained by mechanically positioning an optical fiber and other optical circuit elements on a precisely manufactured jig. Since the size or distribution of manufacturing errors has not yet been sufficiently reduced, there is a disadvantage in that yield is substantially low. However, it is widely recognized that the passive alignment method is a proper method needed for reducing the manufacturing costs of the optical coupling module. Thus, the passive alignment method is now applied to 155-Mbps class modules.

When the optical fiber is aligned with the optical circuit, in the optical coupling module fabricated by the above conventional passive alignment method, the coupling efficiency thereof depends on surface roughness and dimension precision of an etched groove in which the optical fiber is disposed, and mutual alignment accuracy between the etched groove and a pattern of the optical circuit as well as the dimension error of the optical fiber itself.

FIGS. 1 and 2a to 2c show the configuration of a conventional optical coupling module, in which FIG. 1 is a perspective view thereof, FIG. 2a is a plan view thereof, FIG. 2b is a side view thereof, and FIG. 2c is a plan view of mask patterns which are aligned with each other. This optical coupling module establishes optical coupling between an optical fiber of an optical communication module and a polymer optical circuit. On a silicon substrate 1, there is formed a V- or U-shaped etched groove 2, in which the optical fiber is disposed. The polymer optical circuit 5 is fabricated such that a core layer 6 of an optical waveguide can be oppositely aligned with a core 4 of the optical fiber. In order to increase the coupling efficiency, a portion through which light can be introduced may be fabricated in the optical waveguide, if desired. In the prior art shown in FIG. 1, a groove 7 is fabricated with a saw-cut method.

Thus, when such an optical bench is completed, a cladding 3 of the optical fiber with a jacket stripped off is fixed in the etched groove 2 with an adhesive.

In order to increase the optical coupling efficiency, the core 4 of the optical fiber fixed in the etched groove 2 formed on the silicon substrate 1 and the core layer 6 of the optical waveguide of the polymer optical circuit should be straightly aligned with each other, as shown in FIGS. 2a and 2b. FIG. 2c is a plan view of a mask having one mask pattern 2B for forming the etched groove on the silicon substrate 1 and the other mask pattern 6B for forming the core layer 6 of the optical waveguide, which are aligned with each other. In order to increase the optical coupling efficiency of the optical coupling module, optical axes of the optical fiber and optical waveguide should coincide with each other. As the optical widths and shapes of the patterns in the respective circuits become more similar to each other, the optical coupling efficiency is increased. When the optical fiber 3 is disposed in the V-shaped etched groove 2, vertical and horizontal positions of the core 4 of the optical fiber depends on the width and size of the etched groove 2, which are determined according to the mask pattern 2B.

The conventional optical coupling module has the following problems: That is, since the mask pattern 6B should be aligned with the etched groove 2 after the etched groove 2 has been first formed on the silicon substrate, or the etched groove 2 should be aligned with the mask pattern 6B after the mask pattern 6B has been first formed on the mask, alignment processes should be carried out at least two times. Thus, this makes fabricating processes complex. Further, since the etched groove for disposing the optical fiber and the core layer of the optical waveguide are separately fabricated, errors in alignment thereof in a predetermined horizontal and direction angle, exposure errors due to steps formed in the etched groove, and the like may be generated. Further, any errors due to temperature variation during the fabricating process may be generated. That is, in a case where the patterns are spaced apart from each other by about 10 cm in contact alignment, an error of about 0.93 µm/° C. is added, considering thermal expansion of a quartz mask. Furthermore, since the problems associated with the flatness of photoresist and the focus depth caused by the steps in the etched groove are serious in a case of a stepper type, the fabricating process becomes difficult or complicated. Thus, there is a problem in that the alignment error of 1 to 2 µm tends to be generated in the mask layers between the core of the optical fiber and the core layer of the waveguide. Even though the V-shaped groove is formed after the optical waveguide has been formed on the silicon substrate, these problems cannot be eliminated.

That is, since the process of forming the V-shaped groove for aligning the optical fiber therein and the process of fabricating and aligning the optical waveguide with the optical fiber have been separately carried out, there is a problem in that certain alignment errors between the core of the optical fiber and the core layer of the optical waveguide should be generated.

SUMMARY OF THE INVENTION

The present invention is contemplated to solve the above problems in the prior art. An object of the present invention is to provide an optical coupling module, in which one etched groove for disposition of an optical fiber and another etched groove for mounting of an optical waveguide are anisotropically etched simultaneously with a mask having identical mask patterns which are aligned with each other so that errors due to the mask alignment can be reduced, and a method for fabricating the same.

According to an aspect of the present invention for achieving the above objects, there is provided an optical coupling module for optically coupling an optical fiber disposed on one side portion of a substrate with an optical waveguide mounted on the other side portion of the substrate in alignment with the optical fiber, wherein the substrate comprising: a first anisotropically etched groove formed to allow the optical fiber to be disposed therein on the one side portion of the substrate; and a second anisotropically etched groove formed to communicate with the first anisotropically etched groove, to have the same axis as the first anisotropically etched groove, and to guide a core layer of the optical waveguide to a position aligned with the optical fiber.

Further, according to another aspect of the present invention, there is provided a method of fabricating an optical coupling module for optically coupling an optical fiber disposed on one side portion of a substrate with an optical waveguide mounted on the other side portion of the substrate in alignment with the optical fiber, comprising: a first step of forming a mask for anisotropic etching on the substrate; a second step of forming two mask patterns, which are self-aligned to have a common axis and have different widths, on the mask; a third step of forming a first anisotropically etched groove in which the optical fiber is disposed and a second anisotropically etched groove in which the optical waveguide is mounted and which communicates with the first anisotropically etched groove by using the two mask patterns; and a fourth step of mounting the optical waveguide in the second anisotropically etched groove.

Furthermore, according to a further aspect of the present invention, there is provided a method of forming a first broad anisotropically etched groove and a second narrow anisotropically etched groove which communicate with each other by using two mask patterns which are self-aligned to have a common axis on a substrate and have different widths, comprising the steps of; forming an mask for anisotropic etching including a compensation pattern in which a ⊏-shaped beam having a predetermined width extends by a predetermined length from a start portion of one mask pattern for forming the second anisotropically etched groove to another mask pattern for forming the first etched groove; and anisotropically etching the substrate by using the mask.

BRIEF DESCRIPTION OF THE DRAWINGS

The above and other objects and features of the present invention will become apparent from the following description of preferred embodiments given in conjunction with the accompanying drawings, in which:

FIGS. 1 and 2a to 2c show the configuration of a conventional optical coupling module, in which FIG. 1 is a perspective view thereof, FIG. 2a is a plan view thereof, FIG. 2b is a side view thereof, and FIG. 2c is a plan view of mask patterns which are aligned with each other;

FIGS. 4 and 5a to 5c show the configuration of an optical coupling module according to a first embodiment of the present invention, in which FIG. 4 is a perspective view thereof, FIG. 5a is a plan view thereof, FIG. 5b is a side view thereof, and FIG. 5c is a plan view of mask patterns which are aligned with each other;

FIGS. 8 and 9a to 9c show the configuration of an optical coupling module according to a third embodiment of the present invention, in which FIG. 8 is a perspective view thereof, FIG. 9a is a plan view thereof, FIG. 9b is a side view thereof, and FIG. 9c is a plan view of mask patterns which are aligned with each other;

FIGS. 11 and 12a to 12c show the configuration of an optical coupling module according to a fourth embodiment of the present invention, in which FIG. 11 is a perspective view thereof, FIG. 12a is a plan view thereof, FIG. 12b is a side view thereof, and FIG. 12c is a plan view of mask patterns which are aligned with each other;

DETAILED DESCRIPTION OF THE INVENTION

Hereinafter, "an optical coupling module with self-aligned etched grooves and method for fabricating the same" according to preferred embodiments of the present invention will be explained in detail with reference to the accompanying drawings.

Figure 1:
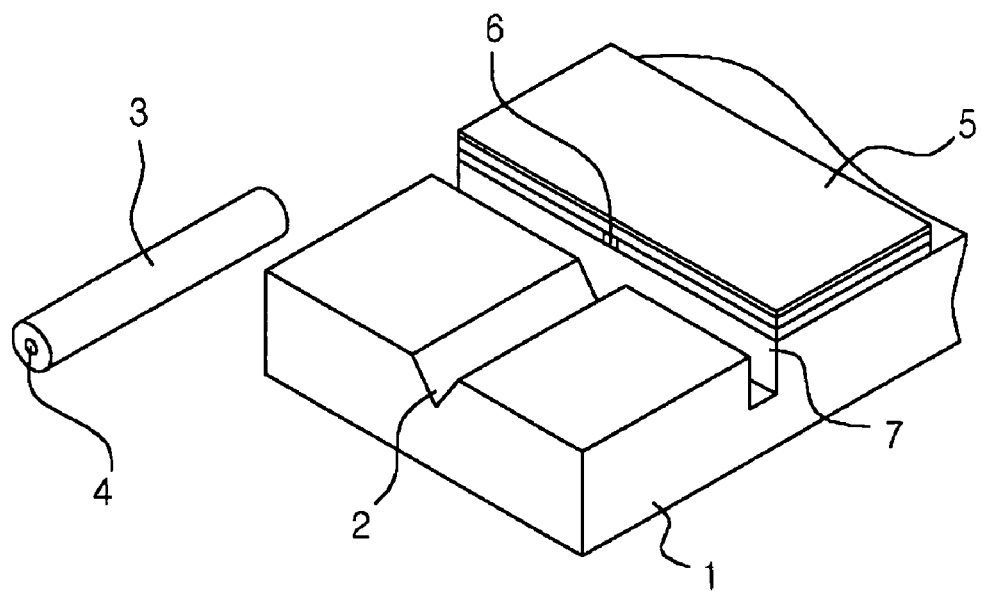
Figure 2A:
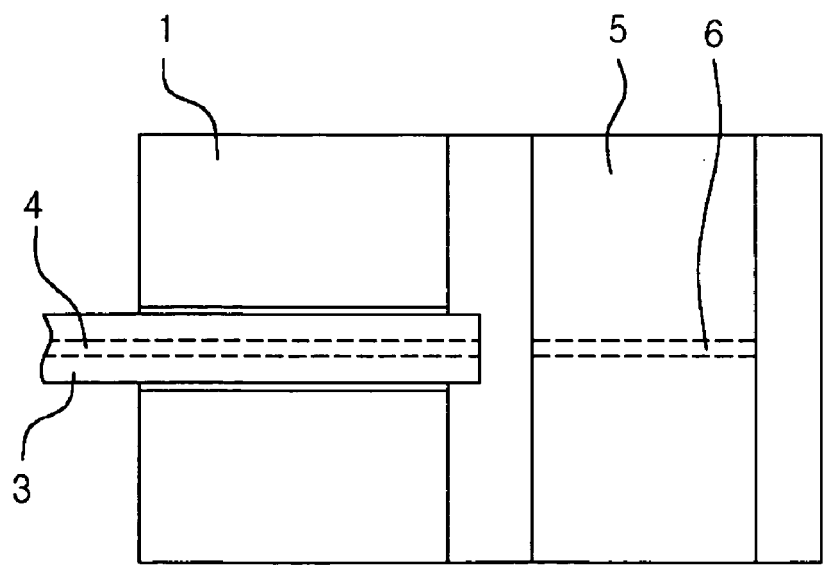
Figure 2B:
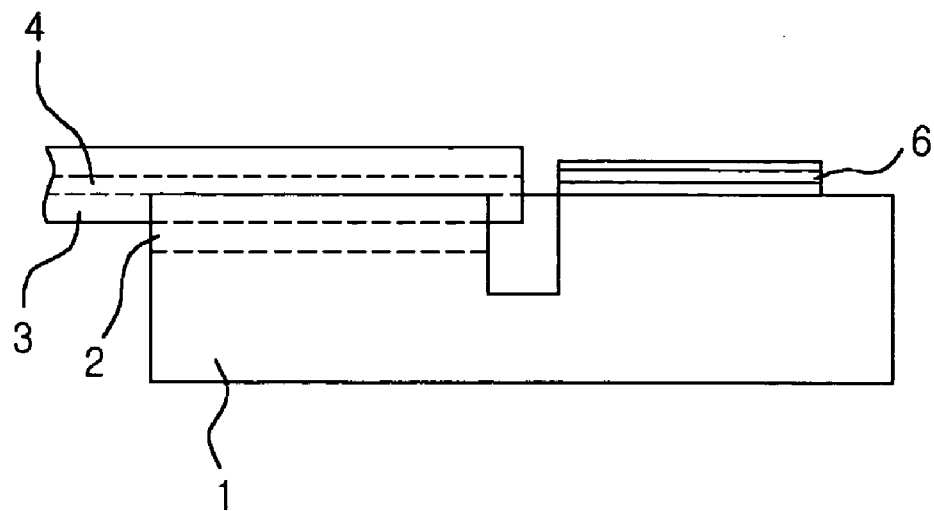
Figure 2C:
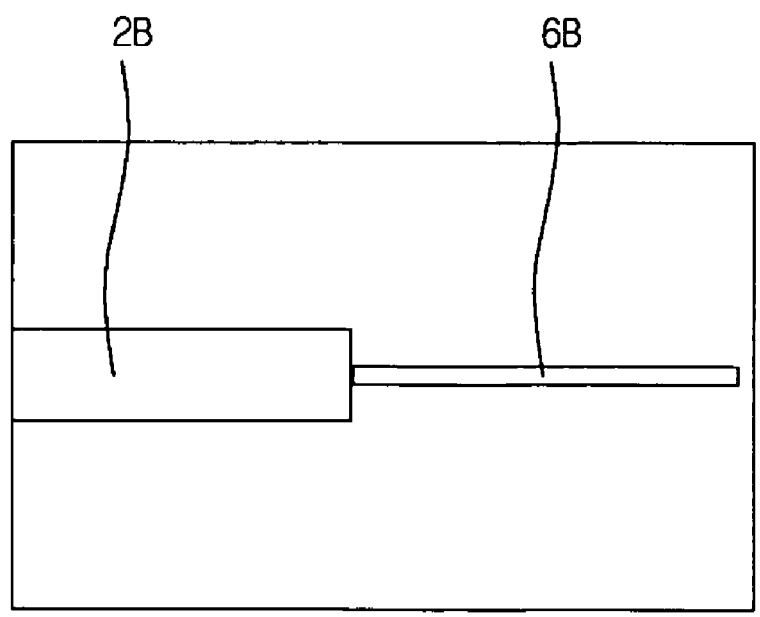
Figure 3A:
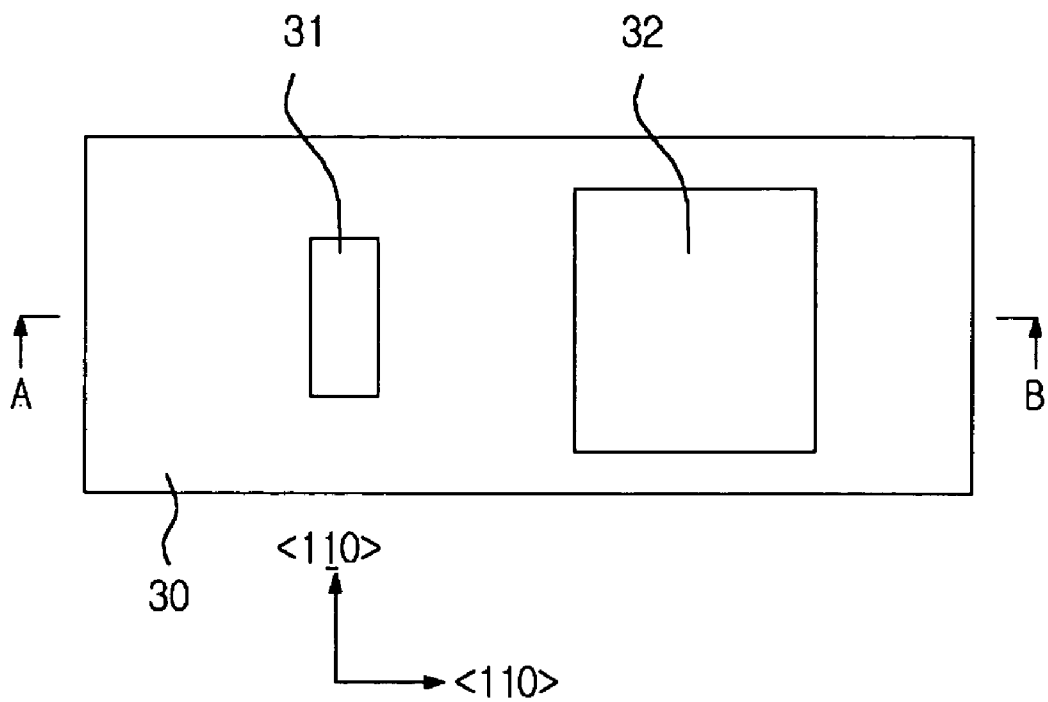
FIGS. 3a and 3b are a pattern diagram of a mask for etching, a sectional view of a substrate to which a series of anisotropic etching processes are applied, respectively, in order to illustrate an anisotropic etching method applied to the present invention.
Figure 3B:
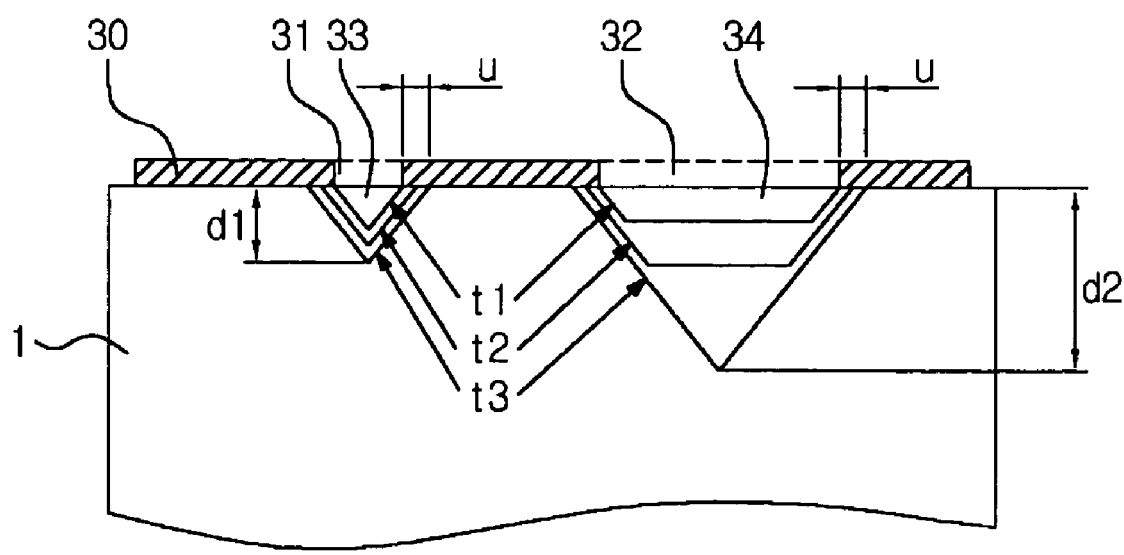

FIGS. 3*a* and 3*b* are a pattern diagram of a mask for etching, a sectional view of a substrate to which a series of anisotropic etching processes are applied, respectively, in order to illustrate an anisotropic etching method applied to the present invention.

An anisotropic etching method uses a principle that an etching rate differs depending on crystal faces of a silicon substrate to be used. According to the present invention, the silicon substrate 1 having a (001) face is anisotropically etched with an etching mask 30 having two patterns 31, 32. As shown in FIG. 3*a*, the patterns 31, 32 formed on the etching mask are caused to have sides which are parallel and perpendicular to a <110> direction, respectively. FIG. 3*b* shows a series of processes of etching the substrate 1 with the etching mask shown in FIG. 3*a*. That is, there is shown a process in which etched grooves 33, 34 vary depending on widths of the patterns as etch time t1, t2 or t3 passes.

Thus, if two self-aligned patterns are formed to have different widths on the mask, there can be simultaneously formed two V-shaped etched grooves which are aligned with each other and have different depths. A silicon semiconductor or a compound semiconductor such as InP or GaAs semiconductor is used for the substrate 1. The respective semiconductors have different etch rates of the crystal faces depending on etch solution. For example, when KOH solution is used, a (001) face is etched about 100 times faster than a (111) face in a silicon crystal. That is, in KOH solution of 30 wt. % at 82° C., the (001) face is etched at an etch rate of 1.2 μm/min, and the (111) face is etched at an etch rate of 0.01 μm/min.

Accordingly, when the mask patterns 31, 32 are formed to have sides parallel or perpendicular to a <110> direction on the (001) face and then etched, the (001) face is etched faster in an initial stage, and the (111) face having the low etch rate is exposed. As the etching process is carried out, the (111) face becomes exposed more and more while the width of the (001) face is gradually reduced. Finally, only the (111) face remains, and the vertical etch rate is reduced to about 1/100 of the initial etch rate. Thus, the etching is substantially stopped to finally form V-shaped grooves. Since the V-shaped grooves are composed of the (111) face, the respective faces forms an angle of 54.7° with respect to the (001) face.

At this time, when the substrate is etched with the two mask patterns 31, 32 having different widths as shown in FIG. 3*a*, U-shaped grooves are changed into V-shaped grooves in progress of the etching and the etch rate is reduced as shown in FIG. 3*b*. When the substrate is etched to have a depth of d1 over a time period of 0 to t1, the groove 33 etched by the narrow mask pattern 31 is already formed into a V-shape. Thus, further depthwise etching is hardly generated. That is, although the groove 34 etched by the broad mask pattern 32 is formed into a V-shaped groove with a depth of d2 through time period of t1 to t2 and t2 to t3, the groove 33 etched by the narrow mask pattern 31 are hardly changed in its shape. Undercut u formed by etching remains to be the same, irrespective of the widths of the mask patterns. If the axes of the two mask patterns coincide with each other and their etched widths are set to be different from each other, the V-shaped grooves having different sizes can be simultaneously formed on the same axis without any alignment errors.

In a case where the substrate to be used in this anisotropic etching is composed of Si, KOH solution, ELDH (Ethyiene-Diamine Pyrocatechol and Water) solution or the like is used as etch solution. A $SiO_2$ thin film or a $SiN_x$ (x=1 to 1.3) thin film is used as the mask for defining the shape of the groove. In addition, photolithography and dry or wet etching are used as a method of forming the mask patterns on the mask.

In a case where the substrate is composed of InP, HCl solution, $HCl-H_2O_2$ solution or the like is used as the etch solution. In a case where the substrate is composed of GaAs, $H_2SO_4-H_2O_2$-water solution, Br-methanol solution or the like is used to anisotropically etch the substrate.

Figure 4:
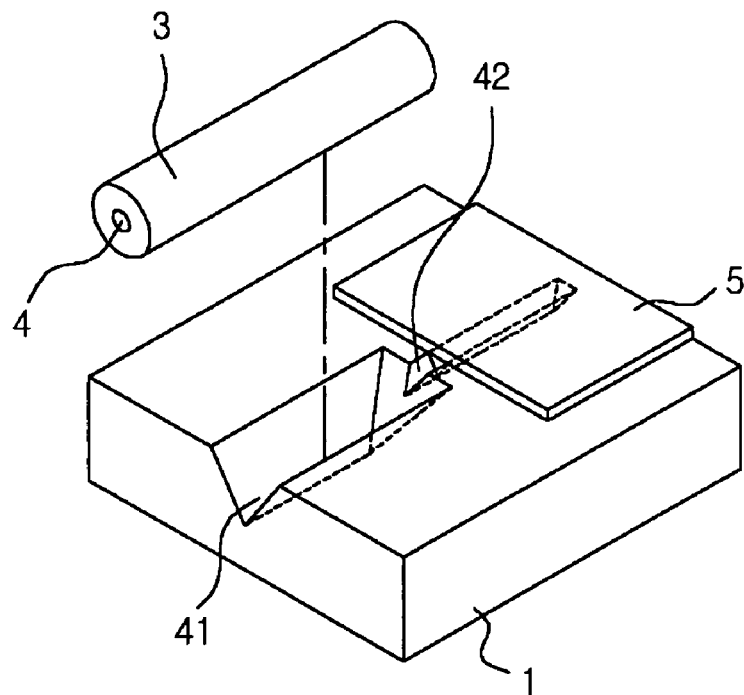
Figure 5A:
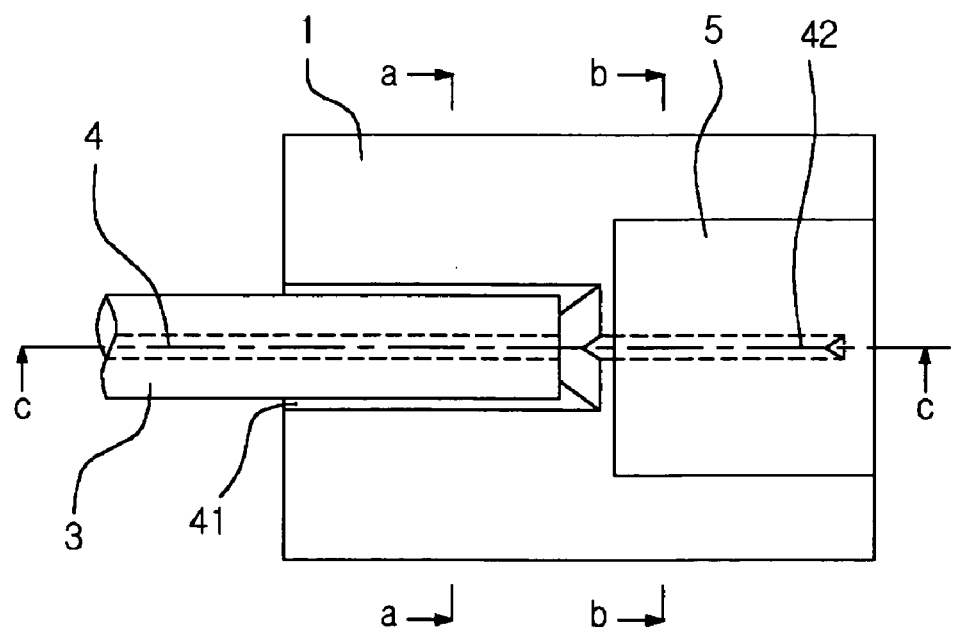
Figure 5B:
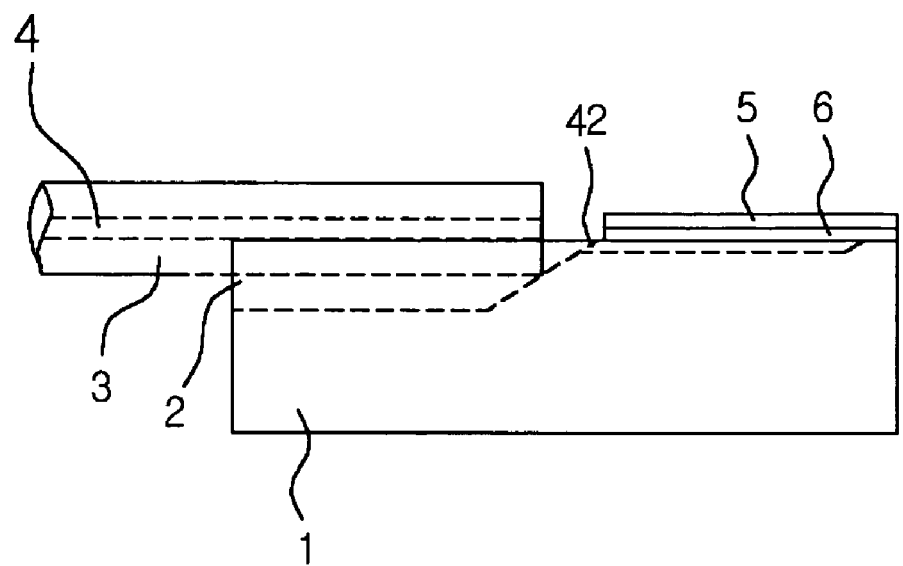
Figure 5C:
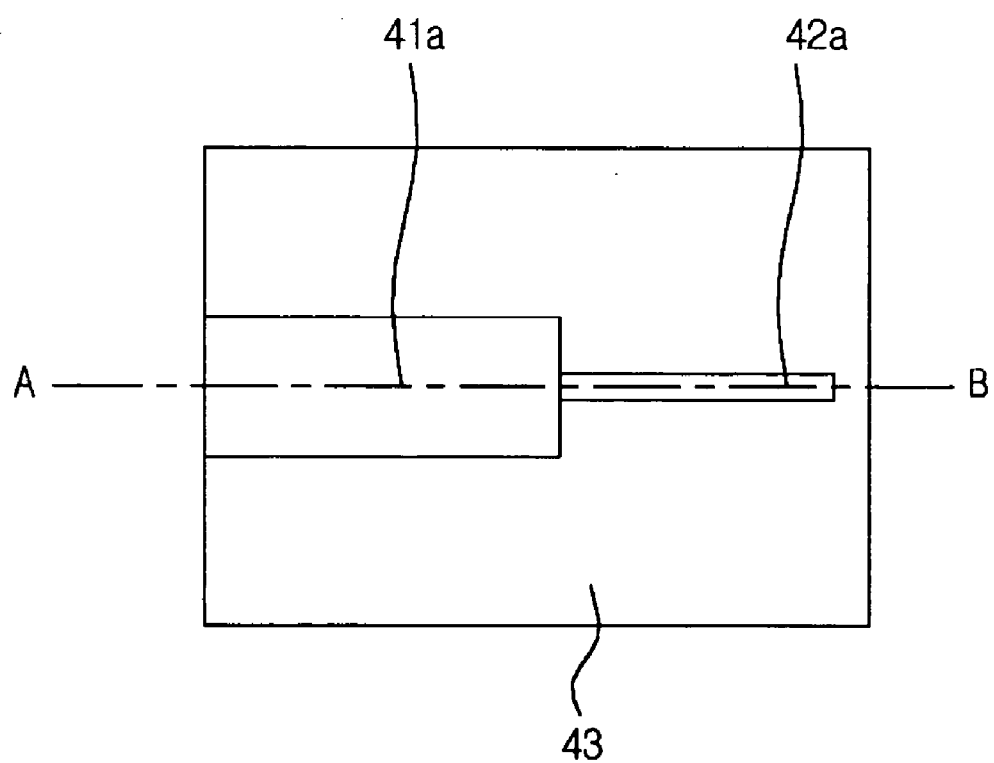

FIGS. 4 and 5*a* to 5*c* show the configuration of an optical coupling module according to a first embodiment of the present invention, in which FIG. 4 is a perspective view thereof, FIG. 5*a* is a plan view thereof, FIG. 5*b* is a side view thereof, and FIG. 5*c* is a plan view of mask patterns which are aligned with each other.

This optical coupling module is fabricated such that an etched groove 41 for mounting the optical fiber on the substrate 1 therein and an etched groove 42 for indicating a fabricating position of the optical waveguide can be self-aligned on a common axis (A-B axis). The etched groove 41 for the optical fiber and the etched groove 42 for the optical waveguide communicate with each other. A mask 43 for forming such an optical coupling module is formed to have one mask pattern 41*a* for forming the etched groove 41 for disposition of the optical fiber and another mask pattern 42*a* for forming the etched groove 42 for the optical waveguide to have different widths on the substrate 1 along the common axis (A-B axis), as shown in FIG. 5*c*. The optical waveguide 5 is formed of silica or polymer such as BCB or polyimide. A core layer of the optical waveguide 5 is formed on the etched groove 42 of the substrate 1.

The width of the etched groove 41 for the optical fiber is determined as follows:

Although the cladding 3 of the optical fiber may vary according to the manufacturer, its diameter is normally 125 μm, and the diameter of the core 4 of the single mode optical fiber (MFD: Mode Field Diameter) is about 10 μm. If the depth h of the core layer of the optical waveguide is the same position level as the surface of the substrate and an angle θ between the etched groove 41 for the optical fiber and the surface of the substrate 1 is 54.7°, the width of the etched groove 41 for the optical fiber can be obtained by the following formula (1). That is, it becomes 153 μm.

$$W = 2*\left(\frac{r}{\sin\theta} - \frac{h}{\tan\theta}\right) \quad (1)$$

where r is the radius of the cladding 3 of the optical fiber to be disposed.

In the mean time, the etched groove 42 for the optical waveguide has a width of about 5 to 15 μm in a single mode, and it has no additional limitation except for its process in a multiple mode.

FIGS. 6a to 6h show a series of processes for fabricating the optical coupling module shown in FIGS. 4 and 5.

In FIGS. 6a to 6h, first columns of the respective figures show sectional views taken along line a—a in the plan view of FIG. 5a; second columns of the respective figures show sectional views taken along line b—b in the plan view of FIG. 5a; and third columns of the respective figures show sectional views taken along line c—c in the plan view of FIG. 5a.

Figure 6A:
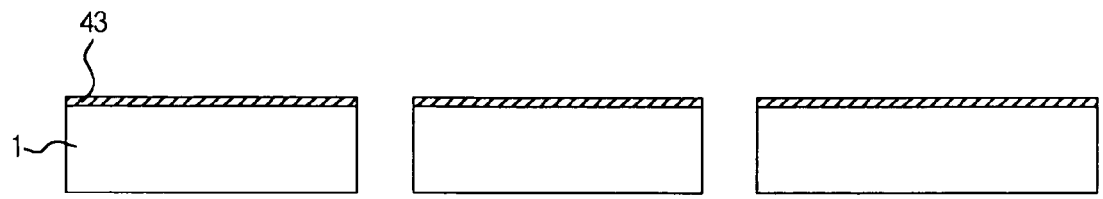
FIGS. 6a to 6h show a series of processes of fabricating the optical coupling module, shown in FIGS. 4 and 5a to 5c, according to the first embodiment of the present invention.

As shown in FIG. 6a, the mask 43 is deposited on the substrate 1. Silicon wafer having the (001) face is used as the substrate 1, and a $SiO_2$ or $SiN_x$ film is used as the mask 43 for anisotropic etching. The mask 43 is formed using a reduced pressure deposition, a plasma enhanced chemical vapor deposition or a sputtering method.

Figure 6B:
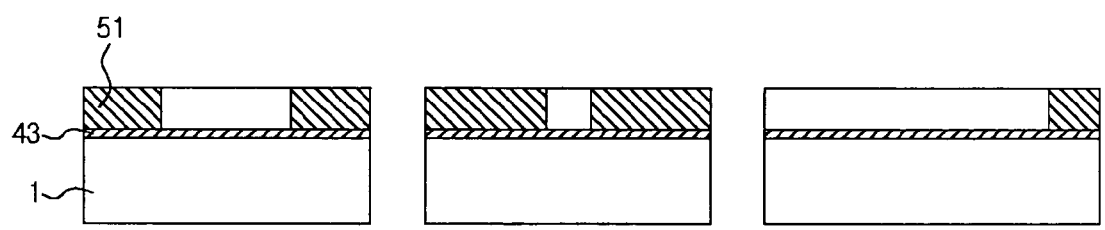

Next, as shown in FIG. 6b, photoresist 51 is coated onto the mask 43 and etched patterns are then formed, by photolithography. At this time, in order to develop the photoresist 51, a mask of which self-aligned mask patterns are drawn by an electron-beam master is used. In order to perform more precise etching, the mask patterns are aligned to accurately coincide with the <110> direction of the substrate or the direction perpendicular to the <110> direction of the substrate. To this end, an OF (orientation flat) of the substrate, which informs an accurate orientation, or a pre-identification etching method is used. Conventional AZ4330 or Az9260 photoresist is used as the photoresist 51.

Figure 6C:
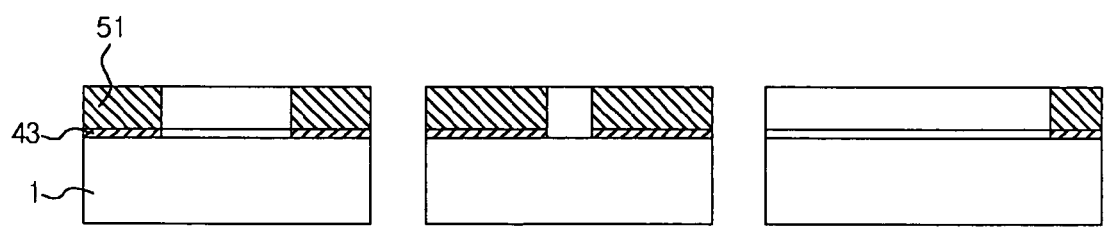

Next, the mask 43 is etched through an exposed window shown in FIG. 6c. In a case where the mask 43 is $SiN_x$ or $SiO_2$ thin film, the mask is etched by a RIE (Reactive Ion Etching) method using plasma-state mixture gas of $CF_4$ and $O_2$, or an etching method using a buffered oxide etchant. Thereafter, the photoresist is removed by a conventional method such as acetone spray.

Figure 6D:
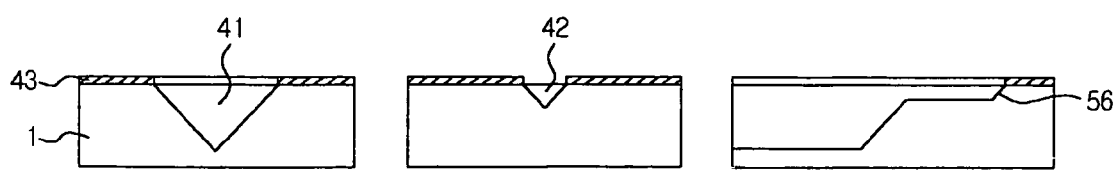

If the mask patterns are defined as such, the etching of the substrate is carried out in anisotropic etch solution such as KOH or EDP solution as shown in FIG. 6d. If an etched width of the etched groove 42 for the optical waveguide is 10 μm, the depth becomes 7.1 μm (=10 μm/2*tan(54.7°)) when the etched groove 42 for the optical waveguide has been completely V-shaped. If the etch rate at the (001) face is 1.2 μm/min under the above etching condition, it takes about 5.9 minutes to perform the etching. On the other hand, the etched groove 41 for the optical fiber becomes V-shaped when the depth is 108 μm. It takes about additional 83 minutes to obtain this V-shape. During this time, the etched groove 42 for the optical waveguide is further etched as deep as about 0.8 μm, resulting in the total depth of 8 μm. However, the radius of the cladding of the optical fiber is 62.5 μm. Thus, even though the U-shaped etched groove for the optical fiber is formed to be as deep as 70 μm, there is no problem in embodying the present invention. Rather, the process time can be shortened as much as 30 minutes. In addition, there is an advantage in that since the step between the etched groove for the optical fiber and the etched groove for the optical waveguide is small, subsequent processes become simplified. In other words, the etched groove 41 for the optical fiber shown in FIGS. 6d to 6h may be U-shaped as shown by a dot line in FIG. 6d, instead of being V-shaped as shown in the figures.

Figure 6E:
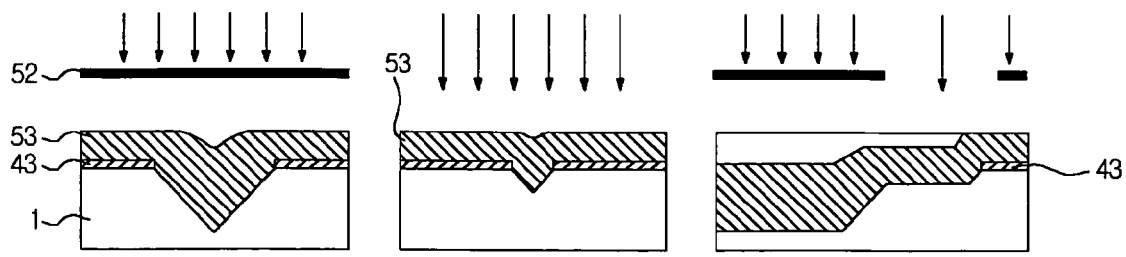

Next, the optical waveguide to be aligned in the etched groove 42 for the optical waveguide is formed. First, FIG. 6e shows exposure state in a case where negative photosensitive polymer is used. On the other hand, in a case where positive photosensitive polymer is used in each layer of the optical waveguide, the mask patterns should be reversed. In order to form a lower clad layer 53 on the substrate 1 on which the two etched grooves are formed, the negative photosensitive polymer is coated at a thickness of about 3 to 5 μm, and then, a portion in which the optical fiber is disposed is masked by a Cr mask 52 and only the portion where the optical waveguide is formed is exposed to an ultraviolet ray. In the present embodiment, BCB having a refractive index of 1.52 is used as the photosensitive polymer.

Figure 6F:
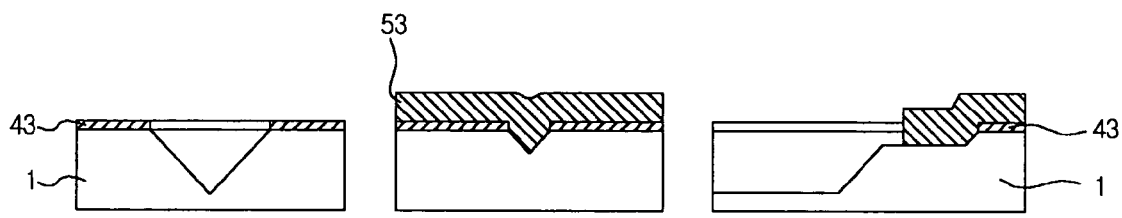

Next, as shown in FIG. 6f, the photosensitive polymer is developed with a developer so that the lower clad layer 53 is formed by only the remaining photosensitive polymer. The photosensitive polymer is cured at a proper temperature. In a case of BCB, it is cured at 250° C. for 1 hour. In the course of this developing process, since the BCB serves as the negative photosensitive polymer, the BCB coated in the deep groove for the optical fiber can be easily removed, irrespective of depth thereof and light intensity applied thereto. In a case where the positive photosensitive polymer is used as the clad layer, the mask patterns should be reversed.

Figure 6G:
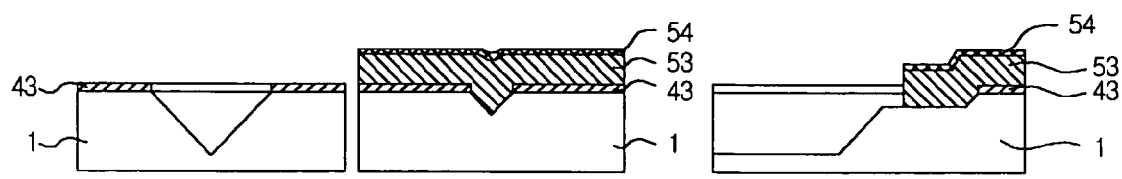

Next, as shown in FIG. 6g, polymer having a high refractive index, for example, polyamide having a refractive index of 1.7 is coated onto the lower clad layer, and then processed in the same method as shown in FIGS. 6e and 6f, resulting in the waveguide core layer 54.

Figure 6H:
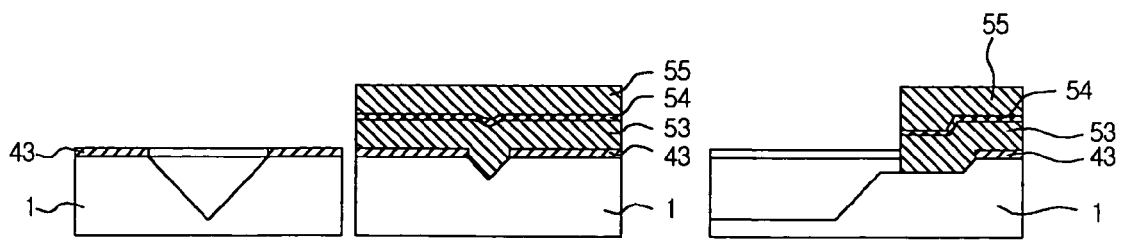

Next, as shown in FIG. 6h, an upper clad layer 55 is formed on the core layer 54. Without forming any other upper clad layers, air (refractive index=1) is used as the upper clad layer. By coating and curing a polymer having a refractive index lower than that of the core layer 54, e.g. BCB, the upper clad layer 55 may be formed.

At this time, as viewed in a cross-section of the optical waveguide, the optical waveguide becomes slightly depressed at a top portion thereof if a viscosity of polymer solution coated in the step of FIG. 6e is lower. Thus, the core layer 54 is also slightly depressed inward from the etched groove, resulting in a crescent structure. Consequently, the crescent waveguide structure having a typical refractive index is obtained.

Figure 13A:
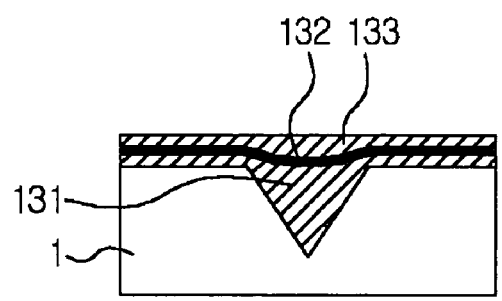
FIGS. 13a to 13f are sectional views of an optical waveguide according to an embodiment of the present invention.
Figure 13B:
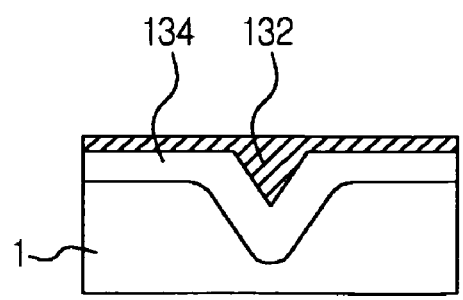
Figure 13C:
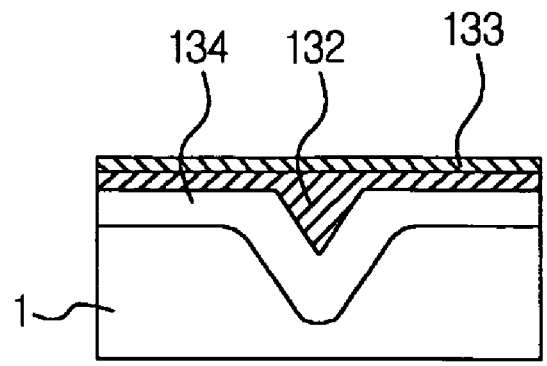

On the other hand, in a case where the viscosity is high, a top portion of the optical waveguide is flat, and thus, the optical waveguide has an inverted triangle structure (refer to FIG. 13c).

In addition to the above fabrication processes, after the etched groove for the optical fiber and the etched groove for the optical waveguide have been formed as shown in FIG. 6d, a longitudinal inclined surface 56 of the etched groove for the optical waveguide is cut out by a saw-cut or dry etching method. Then, scattered reflection at this end portion is prevented so that light can be transmitted in a horizontal direction. In addition, after the etched groove for the optical fiber and the etched groove for the optical waveguide have been formed as shown in FIG. 6d, a metal thin film having a high reflectivity such as Au, Al, Ag or Ni is deposited on the longitudinal inclined surface 56 of the etched groove for the optical waveguide by a conventional lift-off method. Then, a reflector for directing an optical signal passing through the optical waveguide upward can be fabricated.

If the cleaved cladding of the optical fiber is positioned in the etched groove 41 of the optical coupling module fabricated as such, the optical coupling module is assembled by manual alignment.

Figure 7:
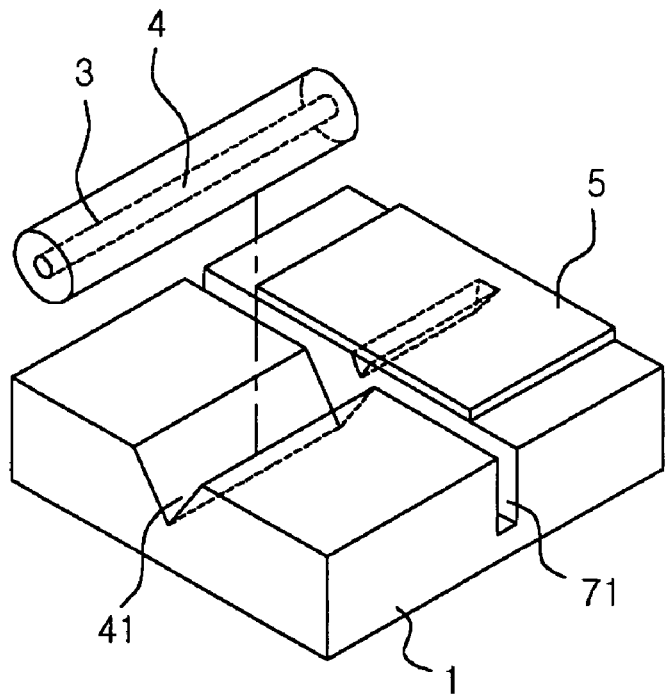
FIG. 7 shows the configuration of an optical coupling module according to a second embodiment of the present invention.

FIG. 7 shows the configuration of an optical coupling module according to a second embodiment of the present invention. The optical coupling module, which has the same configuration as shown in FIGS. 4 and 5a to 5c and is fabricated through the same processes as shown in FIGS. 6a to 6h, has the longitudinal inclined surface of the etched groove for the optical fiber abutting an end of the optical fiber. Further, the optical fiber has a constant diameter. Thus, since the optical fiber and the optical waveguide fail to become close to and are spaced apart from each other due to contact between the inclined surface and the end of the optical fiber, the optical coupling efficiency of the module is not good.

The configuration of the optical coupling module shown in FIG. 7 is provided to solve this problem. A U-shaped groove 71 is formed by saw-cutting the longitudinal inclined surface of the etched groove for the optical fiber after the steps of FIGS. 6a to 6h. Thus, if the inclined surface is removed as such, the optical fiber 3 may come close to the optical waveguide 5, whereby the optical coupling efficiency of the module can be enhanced.

Figure 8:
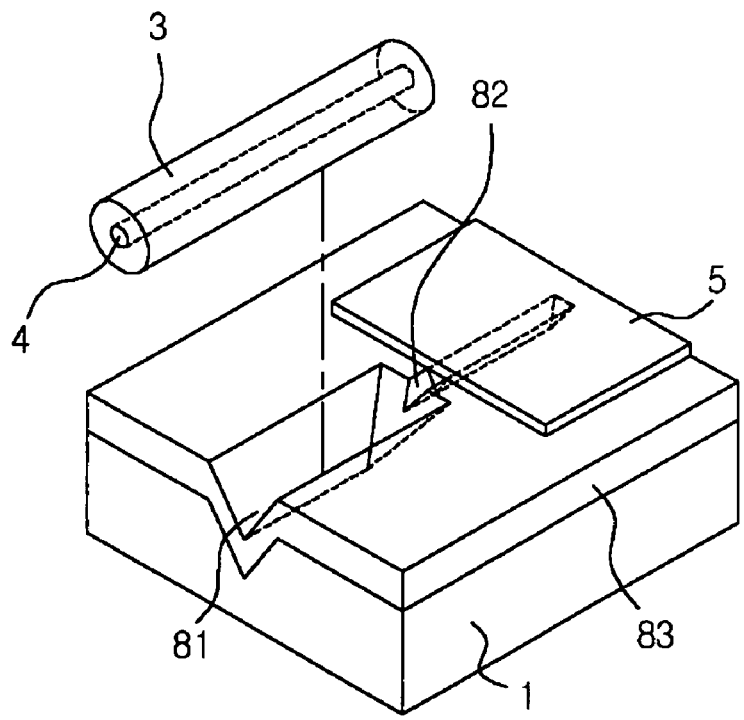
Figure 9A:
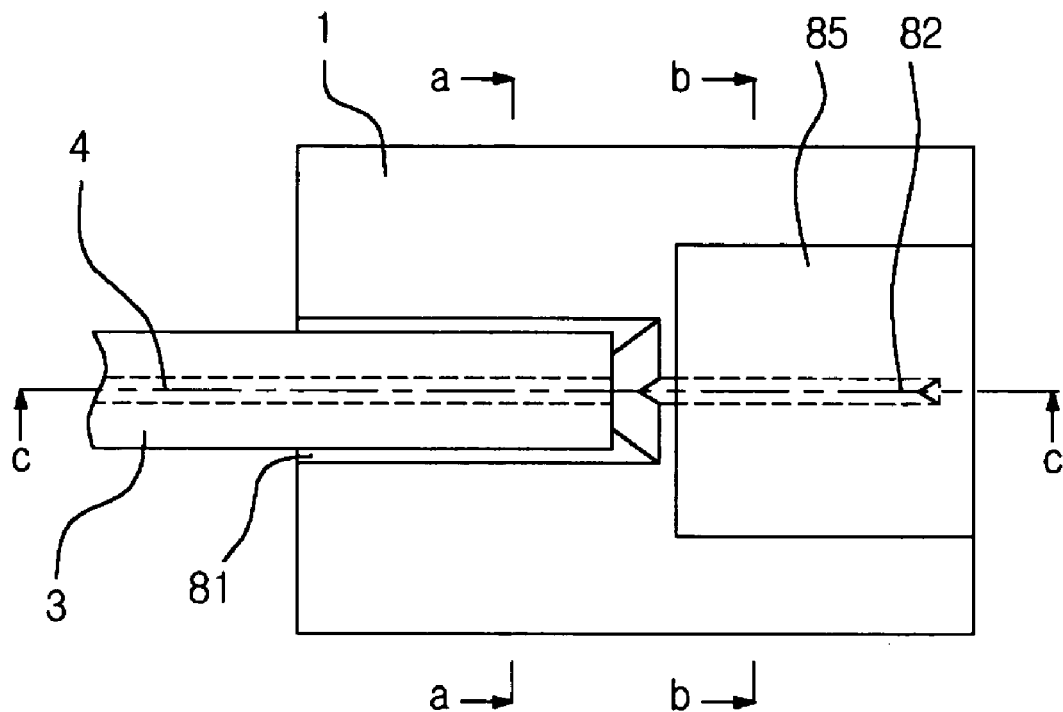
Figure 9B:
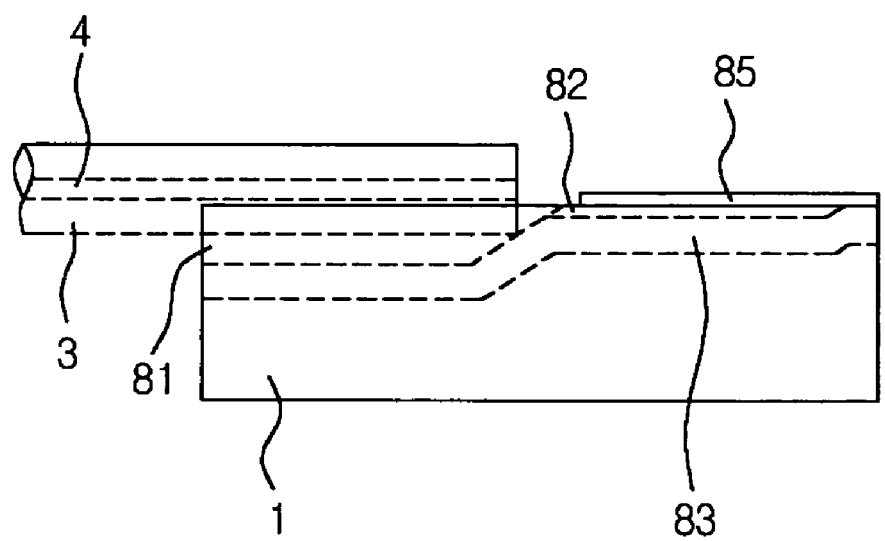
Figure 9C:
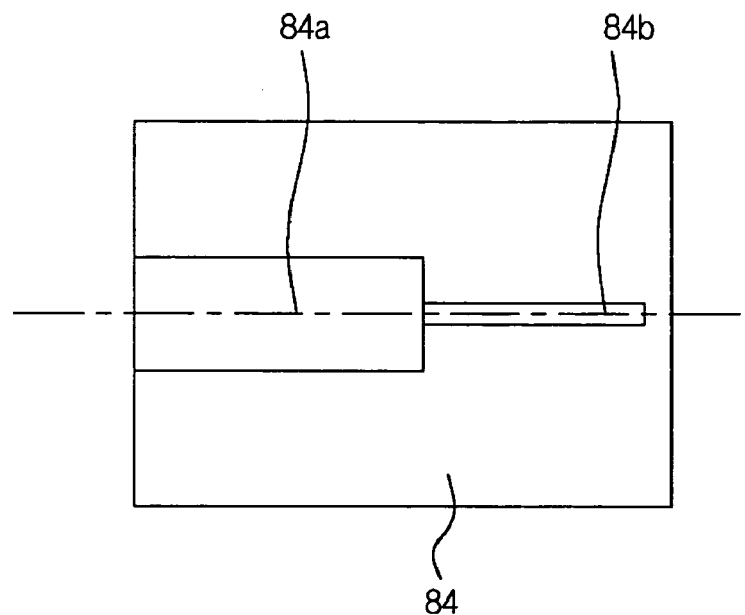

FIGS. 8 is a perspective view of an optical coupling module according to a third embodiment of the present invention; and FIG. 9a is a plan view thereof, FIG. 9b is a side view thereof, and FIG. 9c is a plan view of mask patterns which are aligned with each other.

An insulation film 83 is formed on the substrate 1 having two etched grooves 81, 82, which have different widths and are self-aligned as described above. On this insulation film, the optical fiber is disposed or the optical waveguide is formed. The mask patterns for forming the two grooves on the substrate 1 are shown in FIG. 9c. These two mask patterns 84 are constructed such that a mask pattern 84a for forming the etched groove 81 in which the optical fiber 3 is disposed on the substrate 1 and a mask pattern 84b for forming the etched groove 82 in which the optical waveguide is formed on the common axis are formed to have different widths.

If the insulation film 83 is formed on a part or all of the substrate 1, the insulation film 83 is used as the lower clad layer and a polymer film is used as the core layer 85. Accordingly, the number of the polymer film used in the optical waveguide can be reduced. In addition, by integrating semiconductor chips such as a light receiving element, a received light signal amplifier or the like onto the substrate, parasitic components of the circuit can be reduced, so that high-speed signal processing can be made.

FIGS. 10a to 10h show a series of processes for fabricating the optical coupling module shown in FIGS. 8 and 9a to 9c. First columns of the FIGS. 10a to 10h are sectional views taken along line a—a in the plan view of FIG. 9a; second columns thereof are sectional views taken along line b—b in FIG. 9a; and third columns thereof are sectional views taken along line c—c in FIG. 9a.

Figure 10A:
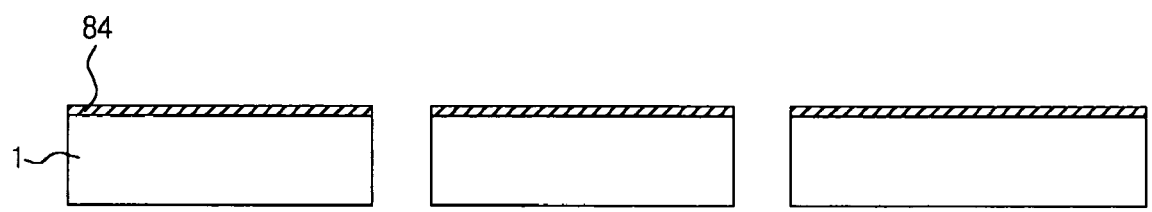
FIGS. 10a to 10h show a series of processes of fabricating the optical coupling module, shown in FIGS. 8 and 9a to 9c, according to the third embodiment of the present invention.
Figure 10B:
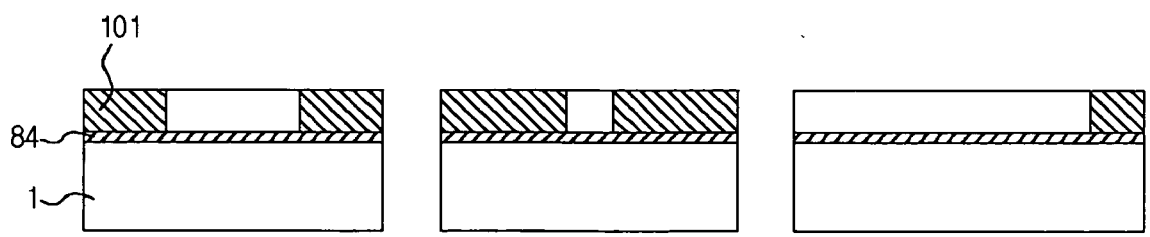
Figure 10C:
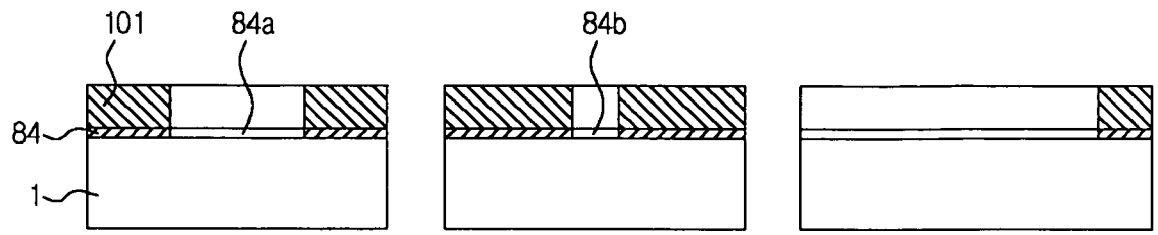
Figure 10D:
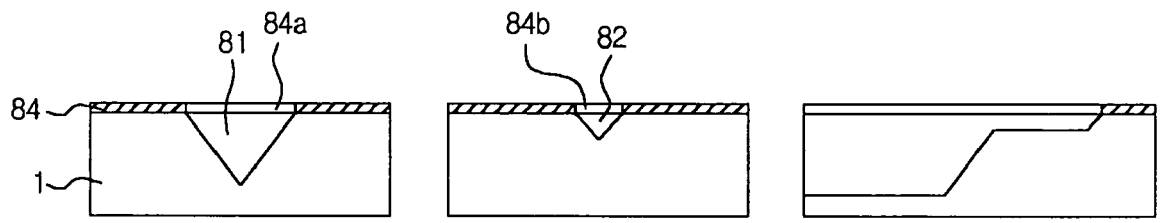
Figure 10E:
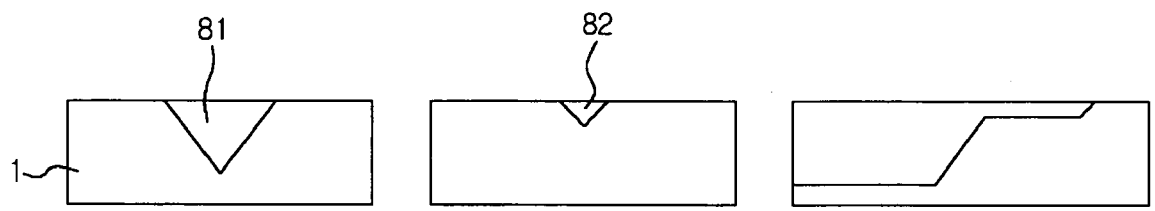
Figure 10F:
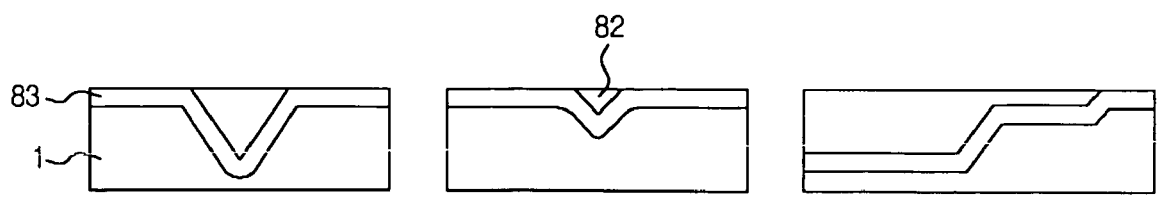

Same processes of this embodiment are identical to those of the embodiment shown in FIGS. 6a to 6h. That is, the processes shown in FIGS. 10a to 10d are carried out in the same manner as shown in FIGS. 6a to 6d. After the etched grooves have been formed as such, the mask is removed from the substrate 1 with the etched grooves formed thereon as shown in FIG. 10a. At this time, if the mask is composed of a $SiN_x$ or $SiO_2$ film, dilute HF aqueous solution or the like is used as the etch solution. Next, the insulation film 83 is formed on the entire substrate on which the two grooves are formed as shown in FIG. 10f.

Among the methods of forming the insulation film on the substrate, a method such as a wet or dry oxidation method, a PE-CVD (plasma enhanced chemical vapor deposition) method, a spin coating method or a sputtering method is used with respect to silicon substrates. A method such as a CVD method, a spin coating method or a sputtering method is used with respect to other substrates, i.e. GaAs or InP substrates. In this way, an oxide film with a thickness of 2 to 10 μm is grown. The other methods of forming the insulation film on the substrate includes a method using an OPS (oxidized porous Si) film, in which a porous silicon layer is grown on the substrate on which the two etched grooves are formed, using an anodization reaction in the HF solution and then oxidized by a wet or dry oxidation method in an oxidation furnace at 900 to 1100° C., resulting in easy formation of the oxide film having a thickness of 10 to 40 μm without causing any strain therein. This method of fabricating the porous oxide film using the anodization reaction is disclosed more specifically in the prior art.

Since the insulation film formed as such substantially follows the V- or U-shaped etched grooves, the V- or U-shaped structure of the grooves can be maintained. In addition, its refractive index is in the range of 1.3 to 1.45, the insulation film may be used as a lower clad layer.

Figure 10G:
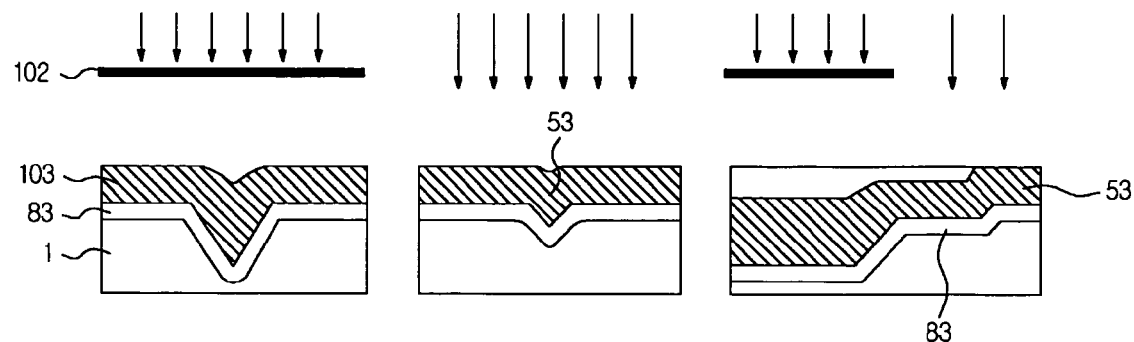
Figure 10H:
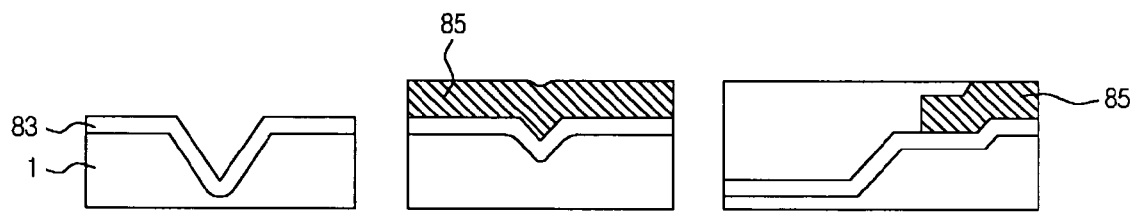

Next, the core layer 85 of the optical waveguide shown in FIGS. 10g and 10h is formed by the method of coating the photosensitive polymer 53 as described in FIGS. 6e and 6f. That is, after a photosensitive polymer such as a BCB photosensitive polymer 103 is coated on the entire substrate at a thickness of 3 to 10 μm, it is exposed and developed. Then, curing is carried out in a state where only the optical waveguide remains. Thus, the core layer 85 is obtained. At this time, when the BCB polymer is coated to be relatively thin as compared with the depth or width of the groove, a core layer having a concave structure in which the core layer of the optical waveguide is depressed inward toward the groove is obtained. Here, if the upper clad layer is formed of $SiO_2$ or the like having a refractive index lower than that of the BCB polymer or exposed to air without any further coating, an optical waveguide having a crescent structure is obtained. On the other hand, if BCB or polymer solution having a higher viscosity is used, an optical waveguide having an inverted triangle structure is formed. The $SiO_2$ film used as the upper clad layer is generally formed by the existing CVD or PE-CVD deposition method. Further, the optical waveguide or $SiO_2$ film is formed by coating and exposing a photoresist through the aforementioned photolithography method, and then wet etching the film in the buffered oxide etchant or dry etching the film with a RIE method while using the photoresist as a mask.

In addition, when the thick insulation film and polymer layer formed at an area other than the optical waveguide are used, parasitic capacitance becomes low. Accordingly, this structure can be applied to substrates for high-frequency circuits.

Especially, when the porous oxide film is used, an oxide film having a thickness of several tens of μm can be formed on a conventional silicon substrate. That is, without using a high-resistance or semi-insulation substrate, the self-resistance of the substrate becomes large, and the leakage current and parasitic capacitance become small. Accordingly, it can be used in optical circuits capable of being operated in the range of up to several tens of GHz.

Figure 11:
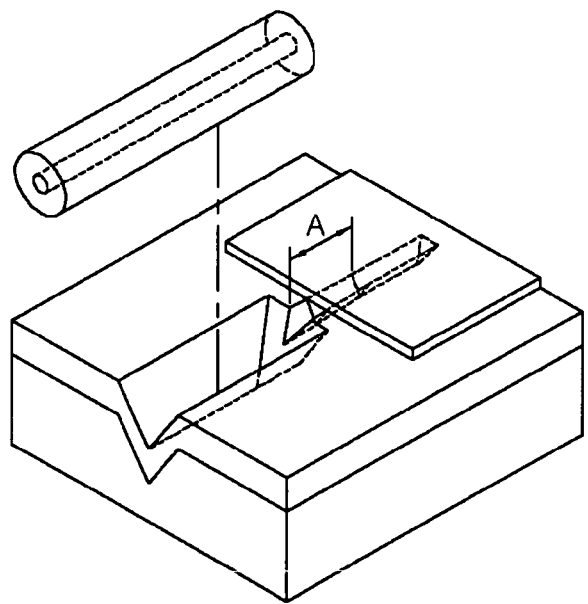
Figure 12A:
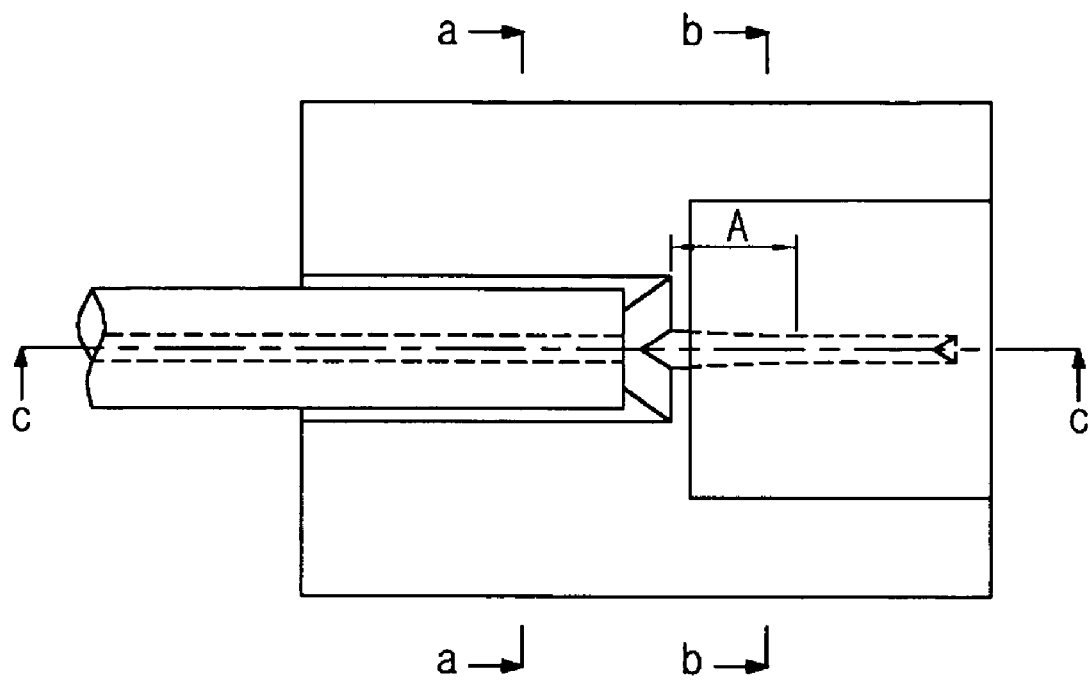
Figure 12B:
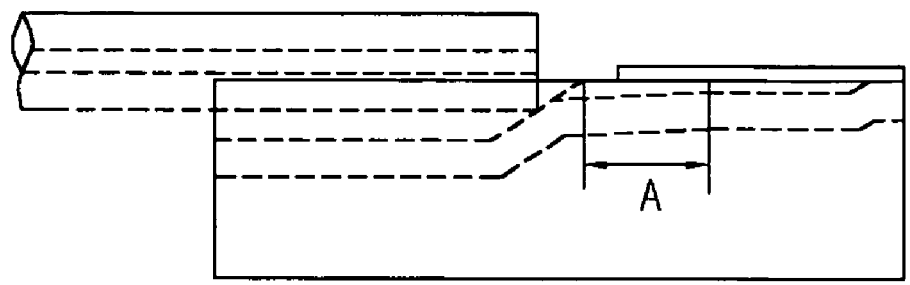
Figure 12C:
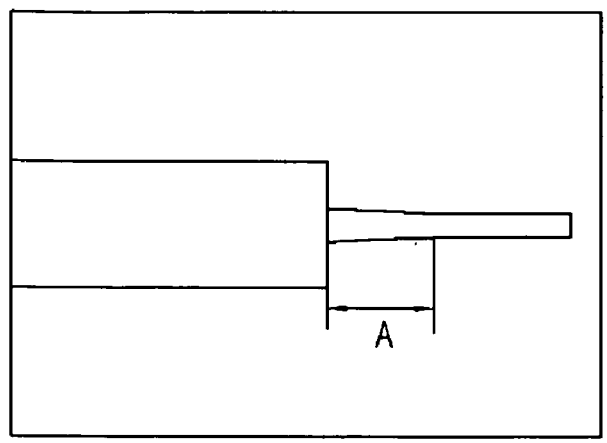

FIGS. 11 and 12a to 12c show the configuration of an optical coupling module according to a fourth embodiment of the present invention, in which FIG. 11 is a perspective view thereof, FIG. 12a is a plan view thereof, FIG. 12b is a side view thereof, and FIG. 12c is a plan view of mask patterns which are aligned with each other.

In this fourth embodiment, a section A of the etched groove for mounting the optical waveguide communicating with the optical fiber is tapered to be widened toward the etched groove for disposition of the optical fiber. In order to form the etched groove for mounting of the optical waveguide as such, a section of the mask pattern should be also designed to be widened toward the optical fiber.

As can be seen from the schematic view of the anisotropic etching process shown in FIGS. 3a and 3b, the etched depth of the V-shaped, anisotropically etched groove is proportional to the width of the mask pattern. Accordingly, when the mask pattern for forming the etched groove for mounting of the optical waveguide is tapered to be widened toward the optical fiber, and the substrate is anisotropically etched with the tapered mask pattern, there can be obtained a 3-dimensional etched groove whose depth is different depending on the width.

The reason why the etched groove for mounting the optical waveguide is formed onto a tapered shape is as follows: An actual diameter error between a cladding of an optical fiber and a core is normally ±1 µm, and a standard of offset of the central axes is about ±0.6 µm. Accordingly, the central axes may be offset by about ±1.6 µm in the worst. This causes the optical coupling efficiency to be lowered during manual alignment. This embodiment is directed to solving of this problem. When the core layer of the optical waveguide is mounted in the tapered etched groove, even if the core of the optical fiber is offset by about several µm in longitudinal and transverse directions from the center of the core layer of the optical waveguide, light can be effectively coupled and guided. Therefore, the optical coupling efficiency can be enhanced. At this time, the gradient of the tapered groove is formed to have about 2/10 to 2/1000 so as to reduce loss of the mode.

Although the structure of the etched groove for mounting the optical waveguide of the embodiment shown in FIGS. 11 and 12a to 12c is shown to be applied to an optical coupling module with an insulation film formed therein, it may be equally applied to an optical module without any insulation film or saw-cut section as shown in FIGS. 4 and 5.

In addition, in this embodiment, an optical fiber jacket itself may be disposed in the etched groove of mounting of the optical fiber instead of the cladding 3 of the optical fiber. Alternatively, the size of the pattern applied to the groove for disposition may be reset by substituting the value of r in the formula (1) with the radius of the jacket.

FIGS. 13a to 13f are sectional views of an optical waveguide according to an embodiment of the present invention.

FIG. 13a is a sectional view of a refractive index waveguide having a crescent structure formed by sequentially forming a lower clad layer 131, a core layer 132 and an upper clad layer 133 in an etched groove for mounting of an optical waveguide.

Figure 13D:
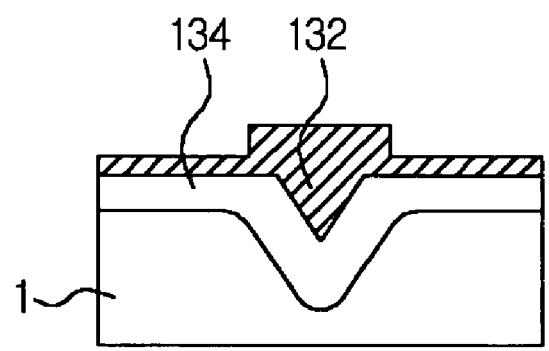

FIGS. 13b to 13d are configurations in which an etched groove has been formed on a substrate 1, and an insulation film 134 is then formed, so that this insulation film 134 can be used as the lower clad layer. FIG. 13b is a configuration in which the core layer 132 of photosensitive polymer such as BCB is formed on the insulation film 134, and air (n=1) is used as the upper clad layer. Of course, in order to enhance the efficiency, a further upper clad layer may be formed by coating substance having a refractive index lower than that of BCB on the core layer. FIG. 13c is a configuration in which the etched groove for mounting of the optical waveguide is filled with the core layer 132, and the upper clad layer 133 is then formed on the core layer. FIG. 13d is a V-shaped groove-rib composite configuration in which a portion of the core layer 132 on the etched groove for mounting of the optical waveguide remains while the other portion is partially etched.

Figure 13E:
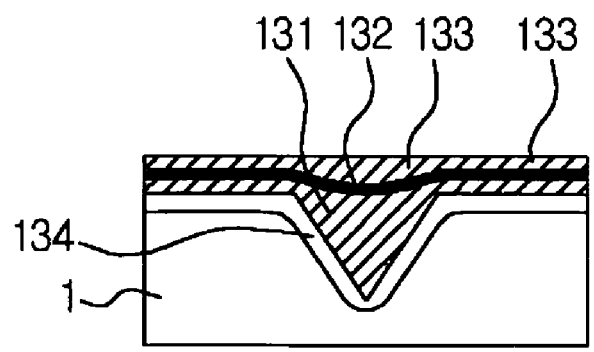
Figure 13F:
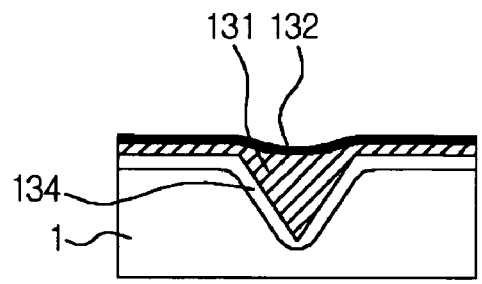

FIGS. 13e and 13f are configurations in which the etched groove for mounting the optical waveguide is formed on the substrate 1, the insulation film 134 is deposited, and the optical waveguide is then formed on the insulation film. FIG. 13e is a sectional view of the refractive index waveguide having a crescent structure in which the etched groove for mounting of the optical waveguide is formed on the substrate 1, the insulation film 134 is deposited, and the lower clad layer 131, the core layer 132 and the upper clad layer 133 are then sequentially formed. FIG. 13f is a sectional view of the refractive index waveguide having a crescent structure in which the etched groove for mounting the optical waveguide is formed on the substrate 1, the insulation film 134 is deposited, the lower clad layer 131 and the core layer 132 are then formed, and air (n=1) is used as the upper clad layer 133.

Figure 14A:
FIG. 14a shows a mask having two rectangular mask patterns for use in an anisotropic etching method according to the first to fourth embodiments of the present invention.
Figure 14B:
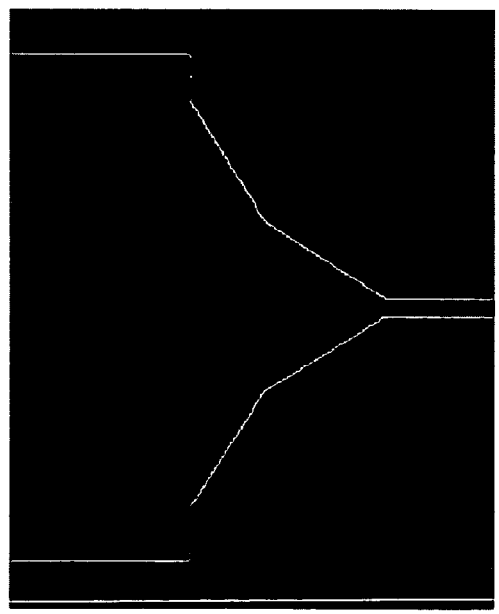
FIG. 14b is a view illustrating a problem of the anisotropic etching method when the mask having the two rectangular mask patterns shown in FIG. 14a are used.

In the first to fourth embodiments, a substrate is anisotropically etched with a mask having two rectangular patterns. That is, there is used the mask on which one rectangular pattern for forming one etched groove for mounting of an optical waveguide and another rectangular pattern for forming another etched groove for disposition of an optical fiber are formed, as shown in FIG. 14a. In this case, strictly speaking, due to undercut at convex corners of the etched groove for disposition of the optical fiber, there is a problem in that the etched groove for disposition of the optical fiber and the etched groove for mounting of the optical waveguide fail to be formed perpendicularly to each other. That is, edge portions of the etched groove for disposition of the optical fiber are retracted toward the optical waveguide in proportion to the etched depth of the etched groove for disposition of the optical fiber, as shown in FIG. 14b.

Figure 15A:
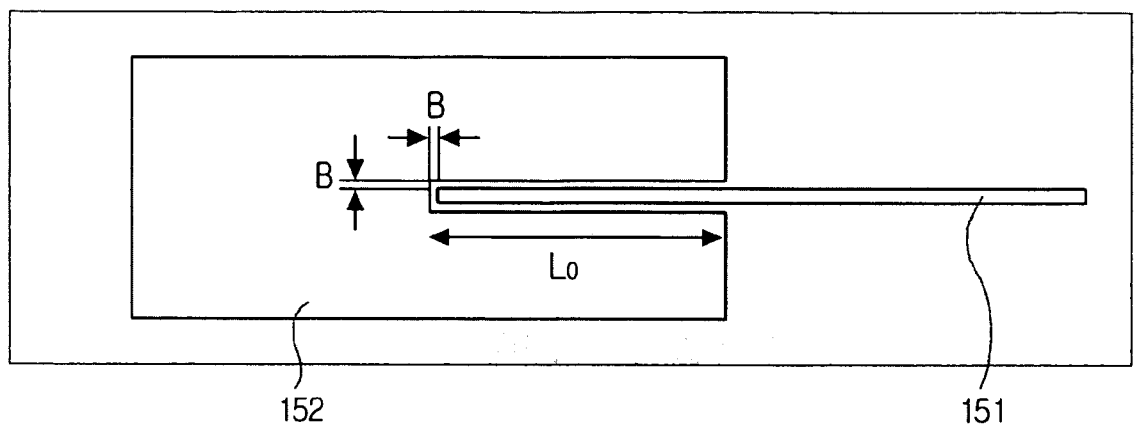
FIG. 15a is a view showing a mask having a compensation pattern according to the present invention.
Figure 15B:
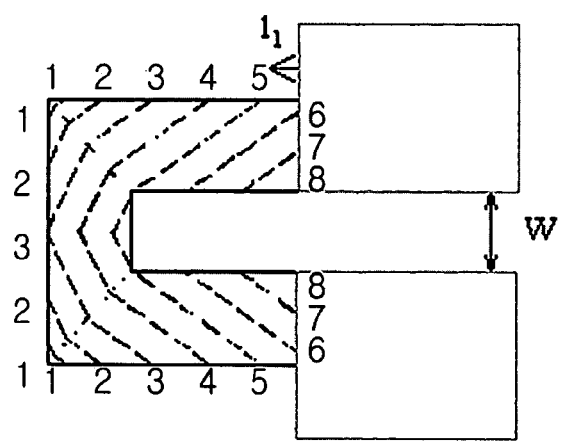
FIG. 15*b* shows a state of progress of the etching where the mask having the compensation pattern of FIG. 15*a* is used.

According to the present invention, in order to solve this problem, the mask pattern is modified as shown in FIG. 15a. That is, a ⊏-shaped beam with a predetermined width B extends by a predetermined length Lo from a start portion of a rectangular pattern 151 for forming the etched groove for mounting the optical waveguide to a rectangular pattern 152 for forming the etched groove for disposition of the optical fiber to form a compensation pattern. When the silicon substrate is etched with a mask on which the compensation pattern shown in FIG. 15a is formed, the etching is carried out with a sequence of 1, 2, 3 . . . 8 by the undercut from the protruding edges as shown in FIG. 15b. Accordingly, portions where the etched groove for disposition of the optical fiber meets the etched groove for mounting of the optical waveguide become right-angled edges.

At this time, the beam width B of the compensation pattern should be at least two times as large as the undercut produced in the etched groove for disposition of the optical fiber during etching of the etched groove. The length Lo of the compensation pattern is associated with the etched depth H. When the ratio of a reduction rate of an outer side of the compensation pattern to a depthwise etch rate is k (at this time, k has a value of 2 to 5 depending on etch solution and an etching condition), the length Lo of the compensation pattern can be calculated by the following formula (2):

$$L_0 = k \cdot H - B\sqrt{3} \quad (2)$$

Figure 16:
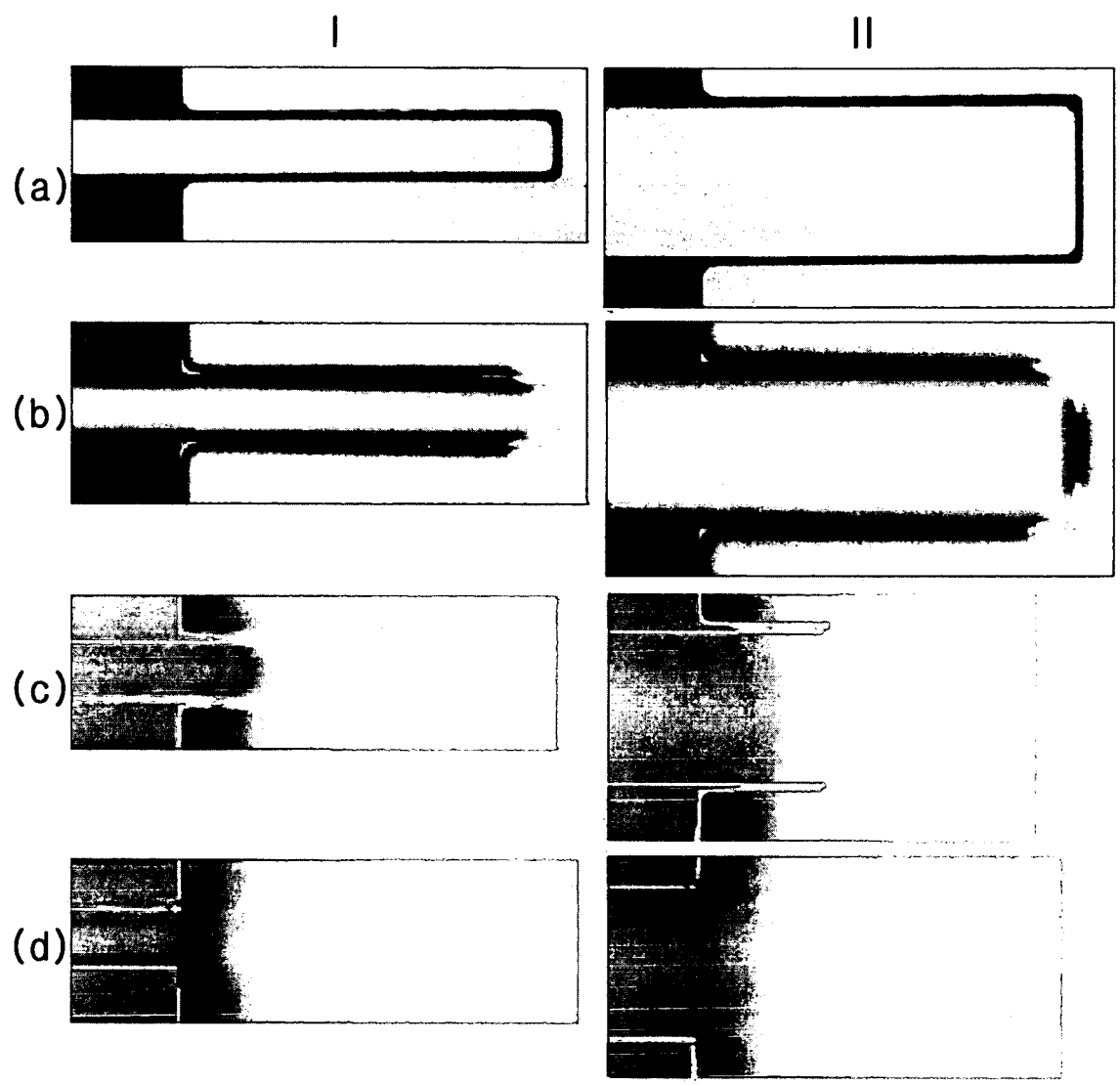
FIG. 16 is a view illustrating a series of etching processes using the mask with the compensation pattern shown in FIG. 15*a* formed thereon.

FIG. 16 shows a series of etching processes using the mask with the compensation pattern shown in FIG. 15a formed thereon. In view of the width of the etched groove for mounting the optical waveguide, that of area II is larger than that of area I. FIG. 16(a) is a photograph of the mask pattern on which the compensation pattern of the present invention is formed. FIG. 16(b) is a photograph of the mask pattern after 5 minutes from start of the etching. A white portion in the photograph is the remaining mask after the silicon substrate is etched by the undercut. That is, the beam of the compensation pattern becomes trapezoid-shaped, and it can be seen from this figure that the etching has been carried out from the protruding edges. FIG. 16(c) is a photograph of the mask pattern after 40 minutes from the start of the etching. FIG. 16(d) is a photograph of the mask pattern after 45 minutes from the start of the etching. As the silicon substrate of the compensation pattern is gradually etched, the portions where the etched groove for disposition of the optical fiber meets the etched groove for mounting of the optical waveguide become right-angled edges.

As describe above, according to the present invention, by forming the etched groove for disposition of the optical fiber and the etched groove for mounting of the optical waveguide with only one alignment exposure and etching process in fabricating the optical coupling module, the alignment error can be reduced and the coupling efficiency can be increased. Furthermore, by forming the etched groove for mounting the optical waveguide as a tapered groove, the incident light can be easily guided even if its position is offset from the optical coupling axis. Furthermore, since the beam width can be maintained to be constant using the optical waveguide, optical coupling with a high-speed light receiving element can be easily established. Furthermore, since the thick oxide film having a low strain and the insulation film, which is an element of the optical waveguide, are used, electric circuit elements operable at a high frequency in the optical bench can be easily integrated.

Although the present invention has been described based on the above preferred embodiments, these embodiments are intended not to limit but to exemplify the present invention. It will be understood by those skilled in the art that various changes, alterations and modifications may be made to the present invention without departing from the spirit and scope of the invention. Therefore, the scope of the present invention should be construed as being limited only by the appended claims, and as covering all the changes, alterations and modifications.

What is claimed is:

1. A method of fabricating an optical coupling module for optically coupling an optical fiber disposed on one side portion of a substrate with an optical waveguide mounted on the other side portion of the substrate in alignment with the optical fiber, comprising:
    a first step of forming a mask for anisotropic etching on the substrate;
    a second step of forming two mask patterns, which are self-aligned to a common axis and have different widths, on the mask through steps of:
        coating photoresist on the entire mask and then forming two etching patterns which have a common axis and different widths,
        etching the mask through an exposed window of the photoresist, and
        removing the photoresist;
    a third step of forming a first etched groove in which the optical fiber is disposed and a second etched groove in which the optical waveguide is mounted and which communicates with the first etched groove, simultaneously by anisotropic etching an exposed window of the two mask patterns; and
    a fourth step of mounting the optical waveguide in the second etched groove.

2. The method as claimed in claim 1, wherein the substrate is a wafer which is composed of one of Si, GaAs and InP, and of which crystallographic structure is (001).

3. The method as claimed in claim 1, wherein the mask is formed by depositing $SiO_2$ or $SiN_x$ on the substrate using one of a reduced pressure deposition, a plasma enhanced chemical vapor deposition and a sputtering method.

4. The method as claimed in claim 1, wherein the mask includes a compensation pattern in which a ⊏-shaped beam having a predetermined width extends by a predetermined length from a start portion of one mask pattern for forming the second etched groove to another mask pattern for forming the first etched groove.

5. The method as claimed in claim 4, wherein the length of the compensation pattern is calculated by the following formula:

$$L_0 = k*H - B_i/\sqrt{3}$$

where Lo is the length of the compensation pattern, k is the ratio of a reduction rate of an outer side of the compensation pattern to an etch rate, H is the etched depth of the compensation pattern, and B is the beam width of the compensation pattern.

6. The method as claimed in claim 4, wherein a minimum value of the beam width of the compensation pattern is at least two times as large as undercut produced in the etched groove for disposition of the optical fiber during etching of the etched groove.

7. The method as claimed in claim 2, wherein the mask pattern is aligned with the substrate such that one side thereof is parallel or perpendicular to a <110> direction of the substrate.

8. The method as claimed in claim 1, wherein the photoresist is one of AZ4330, AZ9260 and photoresist having a viscosity higher than those of the former two photoresist.

9. The method as claimed in claim 1, wherein the photoresist is removed by an acetone spray method.

10. The method as claimed in claim 1, wherein the mask is etched by a reactive ion etching method using plasma of a mixture gas of $CF_4$ and $O_2$ or an etching method using a buffered oxide etchant.

11. The method as claimed in claim 1, wherein the width of the mask pattern for forming the first etched groove is determined by the following formula:

$$W = 2*\left(\frac{r}{\sin\theta} - \frac{h}{\tan\theta}\right)$$

where W is the width of the first etched groove, θ is the angle formed between the first etched groove and the substrate, r is the radius of a portion of the optical fiber to be disposed in the first etched groove, and h is the height of the core layer of the optical fiber from the substrate.

12. The method as claimed in claim 1, wherein the width of the mask pattern for forming the second etched groove is determined as the width of the core layer of the optical waveguide.

13. The method as claimed in claim 1, wherein the third step is performed in KOH or EDP solution.

14. The method as claimed in claim 1, wherein the third step is performed until the depth of the first etched groove becomes larger than the radius of the optical fiber.

15. The method as claimed in claim 1, wherein the fourth step of mounting the optical waveguide further comprises the steps of sequentially forming a lower clad layer of photosensitive polymer and a core layer of photosensitive polymer having a refractive index higher than that of the lower clad layer on the second etched groove.

16. The method as claimed in claim 15, wherein the step of forming the lower clad layer and core layer further comprises the steps of coating photosensitive polymer on the substrate on which the two etched grooves are formed, exposing to ultraviolet rays a portion of the photosensitive polymer on the second etched groove on which the optical waveguide is formed, and developing the photosensitive polymer with a developer and curing the developed photosensitive polymer.

17. The method as claimed in claim 15, wherein the lower clad layer is composed of BCB photosensitive polymer, and the core layer is composed of polyimide photosensitive polymer.

18. The method as claimed in claim 15, wherein the fourth step of mounting the optical waveguide further comprises the steps of forming an upper clad layer of photosensitive polymer having a refractive index lower than that of the core layer, on the core layer.

19. The method as claimed in claim 1, wherein the fourth step is carried out after the two etched grooves have been formed and an inclined surface of a longitudinal end of the second etched groove is saw-cut.

20. The method as claimed in claim 1, wherein the fourth step is carried out after the two etched grooves have been formed and a metal thin film having good reflectivity is deposited on an inclined surface of a longitudinal end of the second etched groove.

21. The method as claimed in claim 20, wherein the metal thin film is composed of one of Au, Al, Ag and Ni.

22. The method as claimed in claim 1, wherein the fourth step is carried out after the two etched grooves have been formed and an inclined surface of the second etched groove communicating with the first etched groove is saw-cut so that a light introducing portion of the optical waveguide can be vertically processed.

23. The method as claimed in claim 1, wherein a section of the mask pattern for forming the second etched groove communicating with the first etched groove is tapered to be widened toward the communicating portion.

24. The method as claimed in claim 23, wherein the gradient of the tapered portion is 2/10 to 2/1000.

25. The method as claimed in claim 1, wherein the fourth step is carried out after the two etched grooves have been formed and the mask is removed.

26. The method as claimed in claim 25, wherein the mask is removed with a dilute aqueous etchant.

27. The method as claimed in claim 25, wherein the fourth step of mounting the optical waveguide further comprises the steps of forming an insulation film on the entire substrate on which the two etched grooves are formed, and forming the core layer of photosensitive polymer on the insulation film of the second etched groove.

28. The method as claimed in claim 27, wherein the insulation film is composed of one of $SiO_2$, $SiN_x$ and porous $SiO_2$.

29. The method as claimed in claim 28, wherein the step of forming the insulation film comprises the step of forming an oxide film on the substrate by a wet or dry oxidation method, a plasma enhanced chemical vapor deposition method, a spin coating method or a sputtering method.

30. The method as claimed in claim 28, wherein the step of forming the insulation film comprises the step of growing a porous silicon layer on the substrate with an anodization reaction in an aqueous etchant and then oxidizing it by a wet or dry oxidation method in an oxidation furnace, thereby forming an oxide film.

31. The method as claimed in claim 28, wherein the step of forming the core layer comprises the steps of coating photosensitive polymer on the substrate on which the two etched grooves are formed, exposing to ultraviolet rays a portion of the photosensitive polymer on the second etched groove on which the optical waveguide is formed, and developing the photosensitive polymer with a developer and curing the developed photosensitive polymer.

32. The method as claimed in claim 31, wherein the core layer is composed of BCB photosensitive polymer.

33. The method as claimed in claim 27, wherein the step of mounting the optical waveguide further comprises the step of forming an upper clad layer of photosensitive polymer having a refractive index lower than that of the core layer, on the core layer.

34. The method as claimed in claim 33, wherein the upper clad layer is a $SiO_2$ layer formed by a chemical vapor deposition method or a plasma enhanced chemical vapor deposition method.

35. A method of forming a first broad anisotropically etched groove and a second narrow anisotropically etched groove which communicate with each other by using two mask patterns which are self-aligned to have a common axis on a substrate and have different widths, comprising the steps of;
 forming an mask for anisotropic etching including a compensation pattern in which a ⊏-shaped beam having a predetermined width B extends by a predetermined length Lo from a start portion of one mask pattern for forming the second anisotropically etched groove to another mask pattern for forming the first etched groove; and
 anisotropically etching the substrate by using the mask, wherein the length $L_0$ is calculated by the following formula:

$$L_0 = k*H - B/\sqrt{3}$$

where k is the ratio of a
 reduction rate of an outer side of the compensation pattern to an etch rate, and H is the etched depth of the compensation pattern.

36. The method as claimed in claim 35, wherein a minimum value of the beam width of the compensation pattern is at least two times as large as undercut produced in the etched groove for disposition of the optical fiber during etching of the etched groove.

* * * * *